(12) United States Patent
Kim

(10) Patent No.: US 8,142,706 B2
(45) Date of Patent: Mar. 27, 2012

(54) DEVICE AND METHOD FOR INJECTION MOLDING PRODUCT HAVING HYDROPHOBIC PATTERN

(75) Inventor: Young Bae Kim, Gyeongnam (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/003,373

(22) PCT Filed: Jul. 20, 2009

(86) PCT No.: PCT/KR2009/003991
§ 371 (c)(1),
(2), (4) Date: Jan. 10, 2011

(87) PCT Pub. No.: WO2010/011061
PCT Pub. Date: Jan. 28, 2010

(65) Prior Publication Data
US 2011/0109015 A1    May 12, 2011

(30) Foreign Application Priority Data

Jul. 25, 2008 (KR) .................. 10-2008-0072817

(51) Int. Cl.
*B29C 45/73* (2006.01)
*B29C 45/37* (2006.01)
(52) U.S. Cl. .............. 264/328.16; 425/548; 425/552
(58) Field of Classification Search ............ 264/328.16; 425/547, 548, 552, 810
See application file for complete search history.

(56) References Cited

U.S. PATENT DOCUMENTS

| | | | |
|---|---|---|---|
| 2002/0164443 A1 | 11/2002 | Oles et al. | |
| 2005/0003146 A1 | 1/2005 | Spath | |
| 2007/0012572 A1* | 1/2007 | Lee et al. | 205/67 |
| 2007/0013106 A1* | 1/2007 | Lee et al. | 264/338 |
| 2008/0054529 A1* | 3/2008 | Kang | 264/328.16 |
| 2009/0260702 A1* | 10/2009 | Kim et al. | 138/39 |
| 2011/0018249 A1* | 1/2011 | Sonnendorfer et al. | 280/781 |
| 2011/0069361 A1* | 3/2011 | Jun et al. | 359/2 |

FOREIGN PATENT DOCUMENTS

| | | |
|---|---|---|
| DE | 10144259 A1 | 3/2003 |
| JP | 2005-225048 A | 8/2005 |
| KR | 10-0436699 B1 | 6/2004 |
| KR | 10-605613 B1 | 8/2006 |
| KR | 10-20090010348 A | 1/2009 |
| WO | WO 2009/028745 A1 | 3/2009 |

OTHER PUBLICATIONS

PCT International Search Report and Written Opinion for Application No. PCT/KR2009/03991, dated Sep. 29, 2009, 9 pages.
Korean Office Action for Application. No. 10-2008-0072817 dated Mar. 5, 2010, with English translation, 9 pages.
Korean Office Action for Application No. 10-2008-0072817 dated Aug. 30, 2010, with English translation, 10 pages.
International Search Report dated Sep. 29, 2009 for Application No. PCT/KR 2009/003991, 3 pages.

* cited by examiner

*Primary Examiner* — Jill Heitbrink
(74) *Attorney, Agent, or Firm* — Fish & Richardson P.C.

(57) ABSTRACT

The present invention relates to device and method for injection molding a product having a hydrophobic pattern, which permits mass production of the product having a hydrophobic surface and clear formation of the hydrophobic pattern on the product. The method includes the steps of heating a mold having a stamper with a hydrophobic pattern formed thereon mounted thereto, bringing the mold into close contact with other molds for enclosing an inside of the molds, injecting a predetermined resin material into the inside of the molds, and cooling down the molds, and separating the molds.

9 Claims, 6 Drawing Sheets

[Fig. 1]
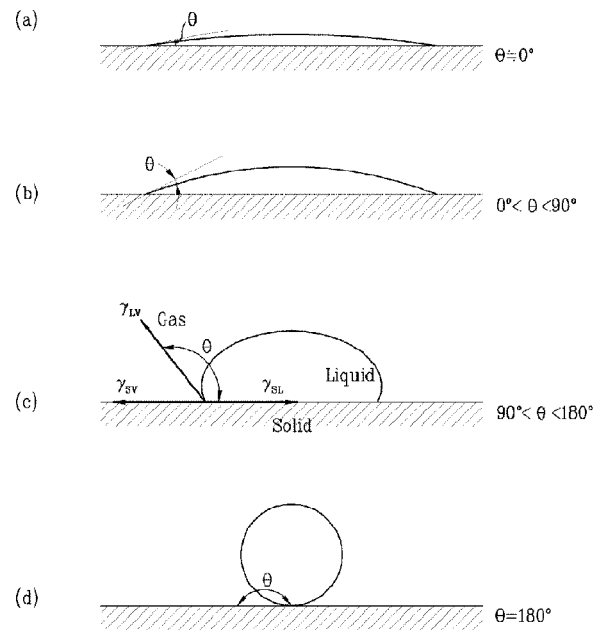
[Fig. 2]
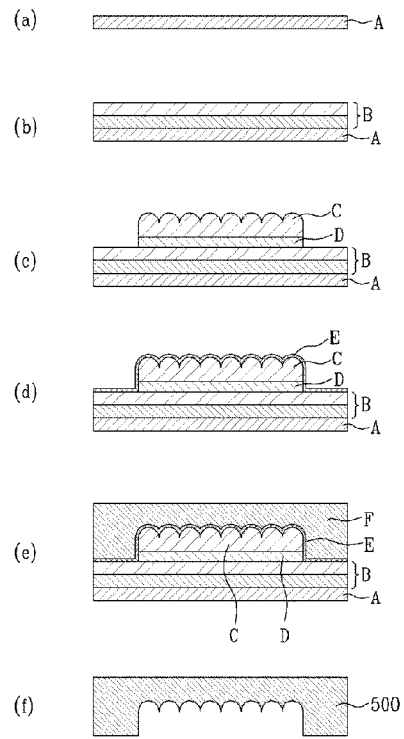

[Fig. 3]
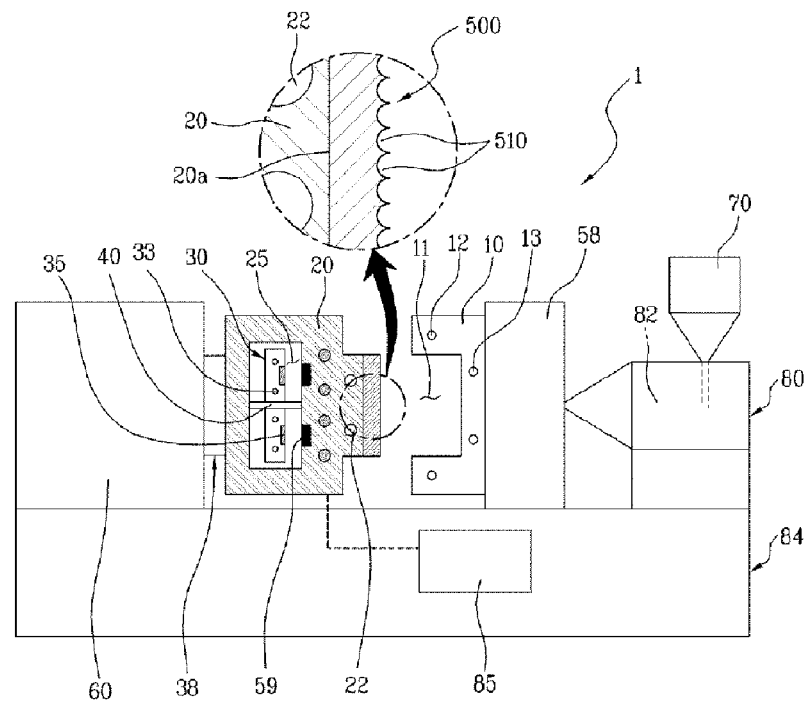
[Fig. 4]
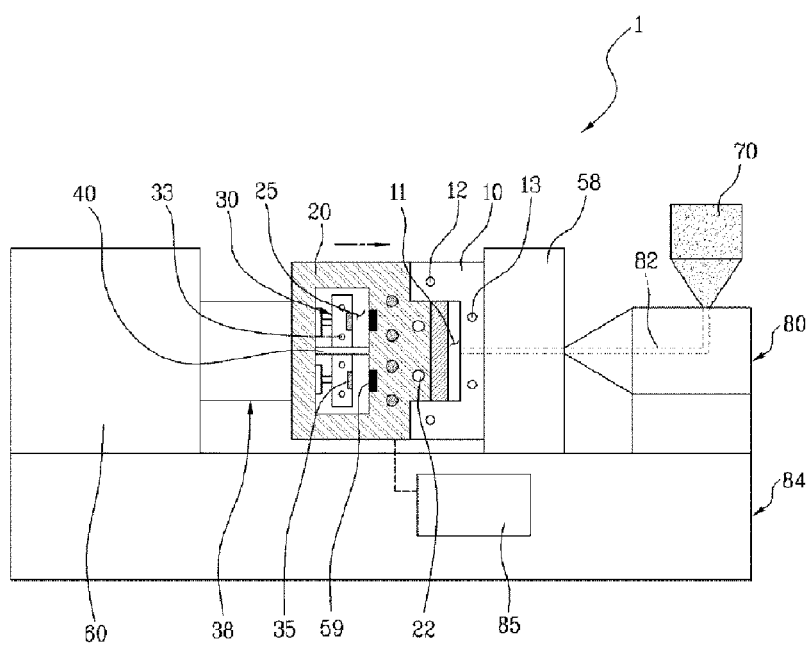

[Fig. 5]
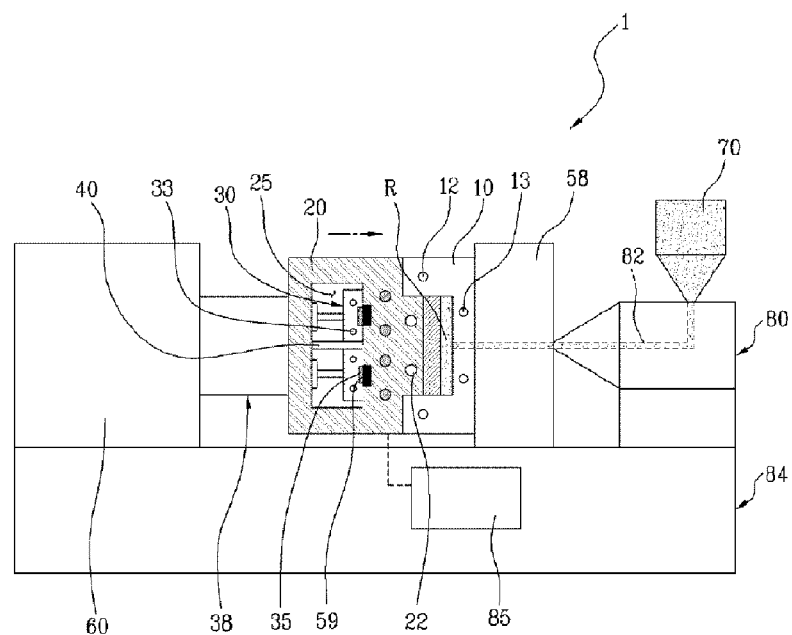
[Fig. 6]
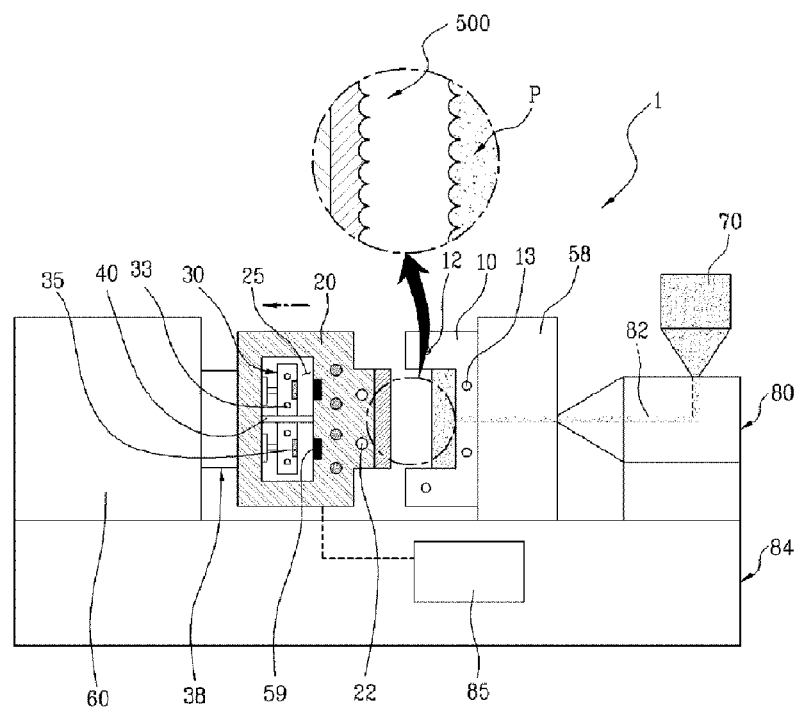

[Fig. 7]
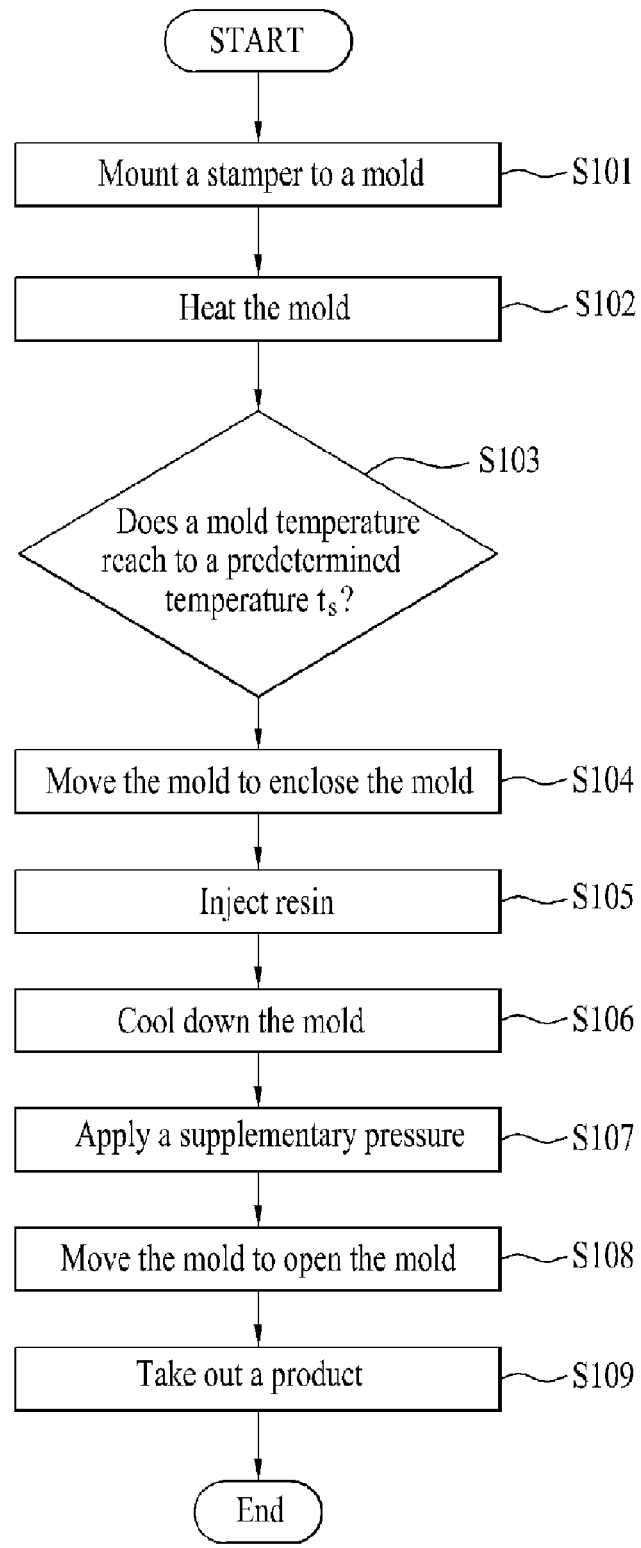

[Fig. 8]
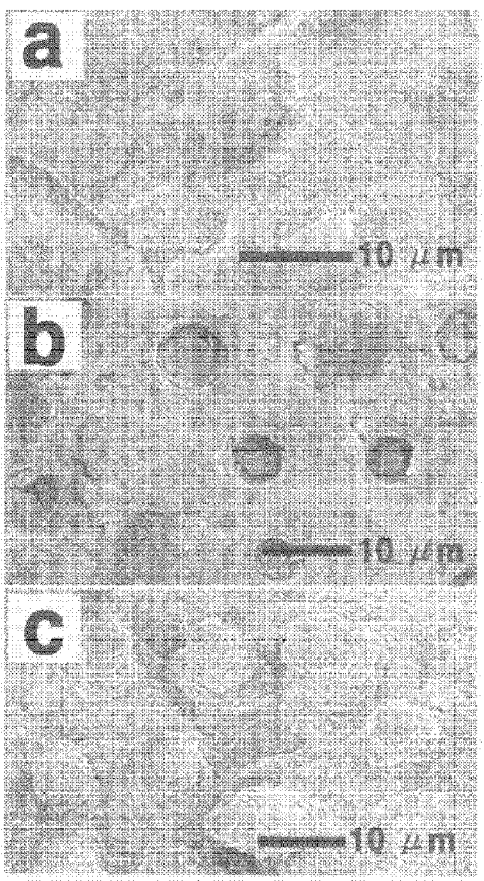
[Fig. 9]
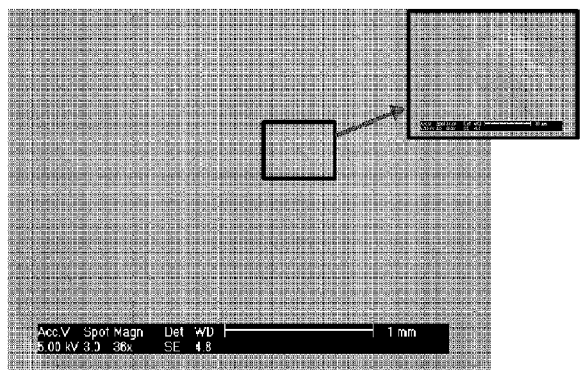

[Fig. 10]
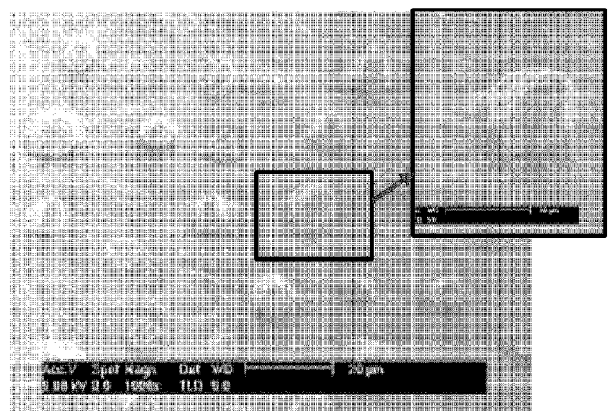
[Fig. 11]
| | Inject resin | | | Supplementary pressure | | Mold temperature (°C) | Contact angle (degree) |
|---|---|---|---|---|---|---|---|
| | Volume (cc) | Time period (sec) | Pressure (Mpa) | Time period (sec) | Pressure (Mpa) | | |
| 1 | 2.66 | 0.2 | 61.6 | 0 | X | X | 104 |
| 2 | 2.66 | 0.19 | 55.7 | 1 | 103.2 | X | 105 |
| 3 | 2.66 | 0.2 | 64.7 | 1 | 103.4 | 180 | 153 |
| 4 | 2.66 | 0.21 | 51.4 | 1 | 103.1 | 200 | 151 |

DEVICE AND METHOD FOR INJECTION MOLDING PRODUCT HAVING HYDROPHOBIC PATTERN

TECHNICAL FIELD

The present invention relates to device and method for injection molding a product having a hydrophobic pattern, and more specifically, the present invention relates to device and method for injection molding a product having a hydrophobic pattern, which permits mass production of the product having a hydrophobic surface.

BACKGROUND ART

In general, wettability of a surface of a material to liquid can be measured by measuring a contact angle of the surface.

The wettability is a mutual interaction (adsorption of the liquid to the surface of a solid) between the surface of the material and liquid molecules, which is a competitive state between an adhesive force between the solid and the liquid and a cohesive force between the liquid molecules.

If the cohesive force between the liquid molecules is stronger than the adhesive force between the solid and the liquid, the wettability is low, and if the cohesive force between the liquid molecules is lower than the adhesive force between the solid and the liquid, the wettability is high.

If the liquid is water, the surface having high wettability is called as hydrophilic surface, and the surface having low wettability is called as hydrophobic surface. The surface having the contact angle higher than 90 degrees is called as a hydrophobic surface, and the surface having the contact angle greater than 150 degrees is called as superhydrophobic surface.

Mostly, the hydrophobicity of the surface is fixed according to chemical properties of the surface itself, and a micro/nano size structure of the surface.

Since the material having the hydrophobic surface is excellent in self-cleaning, anti-fogging, reduction of friction caused by fluid, and so on, the material having the hydrophobic surface is widely used in industrial fields that require such effects.

As W. Barthlott and C. Neinhuis report kinds of plant leaves living in the nature having the superhydrophobicity, various surface shapes of the plant leaves, and various phenomena caused by the various surface shapes of the leaves in 1997, introduced recently, there are many methods for forming a pattern of surface having the superhydrophobicity by changing structural characteristics of the surface, which is called as biomimetics.

DISCLOSURE OF INVENTION

Technical Problem

However, most of the related art methods for forming the hydrophobic surfaces involve changing shapes of the surfaces by complicate chemical process, or changing a surface energy of the material.

The chemical methods require many kinds of process which are troublesome, or have hazards of handling chemicals harmful to human body.

Or, the process itself is expensive, or requires a long time period, and in cases of surfaces formed by some of the methods, the surface loses the hydrophobicity due to pollution of dust when the surface is exposed to the atmosphere.

In the meantime, besides the chemical methods, though there are methods for forming a hydrophobic pattern on the surface of the product by hot stamping or casting, the methods are not favorable in view of time and cost.

Solution to Problem

To solve the problems, an object of the present invention is to provide a device and method for injection molding a product having a hydrophobic pattern, which enables fast production of products having a hydrophobic pattern which is exact.

To achieve these objects and other advantages and in accordance with the purpose of the invention, as embodied and broadly described herein, a method for injection molding a product having a hydrophobic pattern includes the steps of, of a plurality of molds, heating a mold having a stamper with a hydrophobic pattern formed thereon mounted thereto, bringing the mold with the stamper mounted thereto into close contact with other molds for enclosing an inside of the molds, injecting a predetermined resin material into the inside of the molds, and cooling down the molds, and separating the molds.

The hydrophobic pattern is formed as a superhydrophobic pattern having a surface contact angle of 150° to 180°.

The step of heating a mold includes the step of heating the mold with a heater in the mold until a surface temperature of the mold becomes a preset temperature.

The preset temperature is in a range between 120° C. and the melting temperature of the resin to be injected.

The preset temperature is in a range between 120° C. and 180° C.

The step of bringing the mold is performed after the surface temperature of the mold reaches to the preset temperature.

The step of cooling down the molds is performed right after injection of the resin.

The cooling of the molds in the step of cooling down of the molds is made by bringing a cooling mold which is mounted to be able to bring into contact with the molds into contact with the molds.

In another aspect of the present invention, a device for injection molding a product having a hydrophobic pattern includes a mold having a cavity, a stamper in the cavity having a hydrophobic pattern, and a temperature control unit for controlling a temperature of the mold.

The hydrophobic pattern on the stamper is formed to have a surface contact angle of liquid to be greater than 150° and below 180°

The temperature control unit includes a heater in the mold, a cooling mold mounted to be able to be brought into contact with the mold for cooling the mold, and a cooling mold driver for driving the cooling mold.

The heater is provided for heating the mold until a surface temperature of the mold reaches to a melting temperature of the resin injected into the mold.

The mold includes a first mold unit having a cavity, and a second mold unit mounted to be brought into contact with the first mold selectively, wherein the cooling mold is housed in the second mold unit to be movable within the second mold unit.

The device further includes a first magnet mounted to the second mold and a second magnet mounted to the cooling mold such that the cooling mold and the second mold unit are brought into contact with each other or move away from each other by magnetic force, and a guide member mounted in the second mold unit for guiding movement of the cooling mold.

One of the first magnet and the second magnet is an electric magnet and the other one is a permanent magnet.

Advantageous Effects of Invention

The present invention has following advantageous effects.

Fast and mass production of the molded products having the hydrophobic or superhydrophobic pattern can be made, to enhance economy and productivity of such molded products.

The high temperature heating and quick cooling permits smooth patterning of the hydrophobic pattern on the molded product, thereby improving reliability of the product.

BRIEF DESCRIPTION OF DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings:

FIGS. 1a to 1d respectively illustrate shapes of liquid drops varied with surface contact angles, schematically FIGS. 2a to 2f illustrate sections showing the steps of a method for fabricating a stamper having a hydrophobic pattern in accordance with a preferred embodiment of the present invention, schematically;

FIGS. 3 to 6 illustrate side views showing an injection molding device, and the steps of injection molding therewith;

FIG. 7 illustrates a flow chart showing the steps of a method for injection molding a product having a hydrophobic pattern in accordance with a preferred embodiment of the present invention;

FIGS. 8a to 8c illustrate enlarged photographs of a natural substance having a hydrophobic pattern, a stamper therefor, and a surface of an injection molded product, respectively;

FIG. 9 illustrate enlarged photograph of a surface of injection molded product having copby a general mold of prior art.

FIG. 10 illustrate enlarged photograph of a surface of and injection molded product by a high-temperature mold of present invention.

FIG. 11 illustrates a table showing contact angles varied with mold temperatures and supplementary pressures.

BEST MODE FOR CARRYING OUT THE INVENTION

Reference will now be made in detail to the specific embodiments of the present invention, examples of which are illustrated in the accompanying drawings. Wherever possible, the same reference numbers will be used throughout the drawings to refer to the same or like parts.

FIGS. 1a to 1d illustrate shapes of liquid drops varied with surface contact angles, respectively.

The surface contact angle is an angle to a tangent line to a portion a liquid in contact with a surface of solid when the liquid is in a dynamic balance on the surface of the solid.

Referring to FIGS. 1a to 1d, the surface contact angle is measured at a contact point of an end of a liquid curve and the surface of the solid where liquid-solid-gas are in contact. Accordingly, in a case of FIG. 1a, the surface contact angle Q is approximated to 0, in a case of FIG. 1b, the surface contact angle Q is between 0 to 90°, and in a case of FIG. 8c, the surface contact angle Q is between 90° to 180°.

In a case of FIG. 1d, the surface contact angle Q is approximated to 180°.

Thus, if the surface contact angle is greater than 90°, the surface is hydrophobic and if the surface contact angle is greater than 150°, the surface is superhydrophobic. Thus, as the surface contact angle becomes the greater, since a contact area between the solid and the liquid is reduced the more, reducing an adhesive force of the liquid to the solid the more, the liquid can move on the surface of the solid, freely.

FIGS. 2a to 2f illustrate sections showing the steps of a method for fabricating a stamper having a hydrophobic pattern in accordance with a preferred embodiment of the present invention. Though the natural substance used herein is a lotus leaf, the natural substance is not limited to this, but a bamboo leaf, a maple tree leaf, a tulip leaf, a rice leaf, and so on can be used.

Especially, the lotus leaf, having the superhydrophobic pattern on a surface thereof, forms a liquid drop having a surface contact angle greater than 150 degrees if the liquid presents to the surface of the lotus leaf, such that the liquid drop does not stuck to the surface of the lotus leaf, but flows down.

Accordingly, the lotus leaf is selected as one that is easy to obtain from natural substances which have the hydrophobic or superhydrophobic pattern.

The steps of a method for fabricating a stamper having a hydrophobic pattern of a natural substance will be described in detail.

A first conductive layer B as shown in FIG. 2b is formed on a substrate as shown in FIG. 1a by deposition of a electric conductive material, such as chrome, gold, or silver, on the substrate.

Preferably, the substrate A is a silicon substrate.

Referring to FIG. 2c, a lotus leaf C having a predetermined hydrophobic pattern is attached to an upper surface of the first conductive layer B deposited on the substrate A with an adhesive D. It is preferable that the adhesive is a binder of an epoxy group.

Referring to FIG. 2d, since the natural substrate like the lotus leaf has no electric conductivity, a second conductive layer E is formed on an upper surface of the lotus leaf C and an upper surface of the first conductive layer B by a gold ion coating to a thickness enough to reproduce the hydrophobic pattern properly and to perform a metal coating step which will be described later, smoothly.

Referring to FIG. 2e, a metal coating layer F is formed on an entire surface the second conductive layer E and an entire surface the lotus leaf C having the hydrophobic pattern by electric coating. As a material for the metal coating, though nickel, copper, gold, silver, zinc, and so on can be used, the coating material is not limited to this.

If the metal coating is finished to form the metal coating layer F perfectly, a stripping step is performed, to remove the substrate A, the first, and second metal coating layers B and E, and the lotus leaf C having the hydrophobic pattern from the metal coating layer F, to complete a metal stamper 500 having an inverted pattern of the predetermined hydrophobic pattern as shown in FIG. 2f.

Device and method for injection molding a product having a hydrophobic pattern by using a stamper having a hydrophobic pattern will be described.

An injection molding device having the injection mold of the present invention applied thereto will be described, with reference to FIG. 3.

The injection mold of the present invention includes a first metal mold unit 10 and a second metal mold unit 20. The first metal mold 10 has a cavity 11 that is a space for introduction of molten resin thereto.

It is preferable that the first metal mold unit 10 has a heating device, such as a first heater 13, for preventing the resin from solidifying at the time of the injection molding, and a cooling water flow passage 12 for flow of cooling water therethrough, built therein.

The second metal mold 20 has a second heater 22 for heating the second mold unit 20, and a cooling mold 30 in rear of the second heater 22 for cooling the second mold unit 20, built therein.

The cooling mold 30 is movably mounted in a housing 25 provided separately in the second mold unit 20. The housing 25 has a guide member 40 provided therein for guiding movement of the cooling mold 30.

An electric magnet 35 and a permanent magnet 59 are mounted to the cooling mold 30 and the second mold unit 20 respectively, for applying a predetermined intensity of current to the electric magnet 35 to generate an attractive force, or repulsive force, between the electric magnet and the permanent magnet, to bring the cooling mold 30 into contact with the second mold unit 20, in a case of the attractive force, thereby cooling down the second mold unit 20.

The cooling mold 30 has a cooling water flow passage 33 formed therein for introducing cooling water thereto if cooling of the second mold unit 20 is required. If the cooling water is introduced to the cooling water flow passage 33, the second mold unit 20 and the stamper 500 can be cooled down rapidly.

Owing to this, the resin filled in the first and second mold unit 10 and 20 solidifies to take a shape having an inverted pattern of the hydrophobic pattern on the stamper formed thereon. The inverted pattern may be a pattern the same with the hydrophobic pattern of an original lotus leaf or other natural substance.

In the meantime, there are a first mold supporting block 58 at one side of the first mold unit 10 for supporting the first mold unit 10, and a second mold supporting block 60 spaced a distance from the first mold supporting block 58 for supporting the second mold unit 20.

In rear of the second mold unit 30, there is a mold moving unit 38 projected from the second mold supporting block 60 for moving the second mold unit 20 to or away from the first mold unit 10.

On one side of the first mold supporting block 58, there is a resin supply unit 80 for moving the molten resin toward the first mold unit 10, with a hopper 70 mounted thereon for receiving the molten resin.

In order to guide the molten resin from an outlet of the hopper 70 to the first mold unit 10, there is a resin flow passage 82 passed through the resin supply unit 80, the first mold supporting block 60 and the first mold unit 10. Though not shown, it is preferable that the resin flow passage 82 has an additional transfer unit for transferring the molten resin to the first mold unit 10 quickly.

Under the first and second mold supporting blocks 58 and 60 and the resin supply unit 80, there is a base block 84 for supporting them.

In the meantime, at one side of the second mold unit 20, there is the stamper 500 having the hydrophobic pattern provided thereto, and at a surface of one side of the second mold unit 20, there is a stamper attachment portion 20a provided thereto for attaching the stamper 500 thereto.

Though the drawing shows an enlarged view of the hydrophobic pattern 510 on the stamper for showing the hydrophobic pattern 510 clearly, the hydrophobic pattern 510 is invisible with naked eyes.

It is preferable that the stamper attachment portion 20a has a fixture, such as a holder (not shown) or a jig (not shown) for fastening the stamper to make no position change when the stamper 500 and the molten resin are brought into contact with each other in the injection molding.

The stamper 500, formed of a metal like nickel, has in general state before being heated, has a surface temperature significantly lower than the molten resin used in the injection molding.

Therefore, since there is a problem in that the resin solidifies before the hydrophobic pattern 510 is patterned to resin perfectly if the stamper 500 having a relatively low temperature and the molten resin having a high temperature are brought into contact, it is required to maintain surface temperatures of the stamper 500 and the mold to be in the vicinity of a melting temperature of polymer of the resin.

Accordingly, it is required that a liquid state of the resin is maintained for a predetermined time period for forming a pattern the same with the micro pattern on the stamper on a product of the resin as the liquid resin is brought into contact with the stamper 500. Therefore, it is required that the surface temperature of the stamper is a melting temperature of the resin for the time period.

In the meantime, a temperature control unit 85 is provided to the base block 84 of the injection molding device.

Since a main purpose of the cooling mold 30 and the second heater 22 mounted to the second mold unit 20 is fast heating and fast cooling of the stamper 500, mostly the temperature control unit 85 serves to make fast temperature control of the surface of the stamper 500.

Injection molding with the stamper 500 having the hydrophobic pattern 510 in accordance with a first preferred embodiment of the present invention will be described.

Referring to FIGS. 3 and 7, the stamper 500 having the hydrophobic pattern 510 is fastened to the stamper attachment portion 20a of the second mold unit 20 S101 (see FIG. 7). Then, upon applying an instruction that the surface temperature of the stamper 500 and the first and second mold unit 10 and 20 is to be higher than a certain temperature to an operational button, a current flows to the first and second heaters 13 and 22 to heat the first and second mold unit 10 and 20 by heat resistance, along with the stamper 500.

The heating temperature is a preset temperature ts, more specifically, the melting temperature of the resin S102 (See FIG. 7).

In this instance, since a current flow to the electric magnet 35 to generate repulsive force between the permanent magnet 28 and the electric magnet 35, the second mold 20 and the cooling mold 30 are spaced from each other.

Then, reach of the second mold unit 20 to the preset temperature ts is determined S103 (See FIG. 7). If it is determined that the second mold 20 reaches to the preset temperature ts, while maintaining a spaced state between the second mold unit 20 and the cooling mold 30 and a heated state of the first and second mold units 10 and 20 and the stamper 500, as shown in FIG. 4, the second mold unit 20 moves to the first mold unit 10 until the second mold unit 20 moves to the first mold unit 10 are brought into close contact, an enclosed cavity 11 of a shape of the product is formed between the first mold unit 10 and the stamper 500 S104 (See FIG. 7).

Referring to FIGS. 5 and 7, in a state the second mold unit 20 and the first mold unit 10 are in close contact to form the enclosed cavity 11, the molten resin R is introduced to the cavity 11 to fill the cavity 11 and between the hydrophobic patterns 510 on the stamper 500, to copy the hydrophobic pattern 510 as it is S105 (See FIG. 7).

Right after the introduction of the resin, if the first and second heaters 13 and 22 are turned off, and an attractive force is generated between the electric magnet 35 and the permanent magnet 59, the cooling mold 30 is brought into contact with the second mold 20, and the cooling water is introduced to the cooling water flow passage 33 in the cooling mold 30 and the cooling water flow passage 12 in the first mold 10, the first and second mold units 10 and 20 and the stamper 500 are cooled, to solidify the resin filled in the cavity 11 S106 (See FIG. 7).

However, for enhancing endurance of the product as the resin is filled in the cavity 11 fully before the solidification of the resin, a supplementary pressure application step is taken, in which the resin is injected into the cavity 11 forcibly S107 (See FIG. 7).

Then, referring to FIGS. 6 and 7, the second mold 20 is moved away from the first mold unit 10, to obtain the product P having the hydrophobic pattern 510 on the stamper 500 from the cavity 11 S108 and S109 (See FIG. 7).

Referring to FIG. 8, a photograph (a) shows the hydrophobic pattern of a nano size on the lotus leaf, and a photograph (b) is the hydrophobic pattern on a metal (nickel) stamper formed in a stamper fabrication process shown in FIGS. 2a to 2f.

A photograph (c) is an enlarge view of the hydrophobic pattern formed on a surface of the product molded by using the injection molding device and the stamper.

Referring to FIG. 8, it can be known that the hydrophobic pattern of the nano size on the lotus leaf is patterned to the surface of the product the same with each other actually by using the metal stamper as a medium. FIGS. 8a to 8c illustrate a surface state of the lotus leaf, a surface of the stamper having the surface of the lotus leaf patterned thereto, and a surface state of the product mold by using the stamper, respectively.

FIG. 9 illustrate an enlarged photograph of a copied patterns on the surface of mold product from the patterns on the lotus leaf by a general mold as prior art. And, FIG. 10 illustrate an enlarged photograph of a copied patterns on the surface of mold product from the pattern on the lotus leaf by the high temperature mold of the present invention.

As illustrated in FIG. 9 and FIG. 10, difference of the shape of each pattern on each surface is definite.

That is, as illustrated in FIG. 9, if the patterns on the lotus leaf is copied to the surface of the mold product by the general mold not being heated, the copied pattern on the surface of the mold product is faint and indistinct. Therefore, the hydrophobicity is relatively weak.

In contrast, if the high temperature mold is used to copy the patterns of the lotus leaf to the surface of the mold product, the character of copy is enhanced. Thus, the pattern of the lotus leaf is definitely copied to the surface of the mold product. Accordingly, the hydrophobicity is increased as the surface contact angle is increased.

In the meantime, FIG. 11 illustrates a table showing contact angles varied with mold temperatures and supplementary pressures in a case a predetermined resin is used. The resin used is COC (Cyclo-olefin copolymer) having a melting point of about 180° C.

Referring to FIG. 11, a first case has the surface contact angle of 104° in a state of no supplementary pressure application and no heating of the mold, and a second case has the surface contact angle of 105° when the supplementary pressure is applied at 103.3 MPa for one second and the mold is not heated.

In the meantime, a third case has the surface contact angle of 153° when the supplementary pressure is about 103 MPa and the mold temperature is maintained at 180° C., and a fourth case has the surface contact angle of 151° when the supplementary pressure is about 103 MPa and the mold temperature is maintained at 200° C.

In the experiment, although no heat, 180° C. and 200° C. to the mold are conditioned respectively, it is preferable that the temperature of the resin by heating to the mold is between 120° C. and the melting point of the resin.

In detail, it is preferable that the temperature of the resin is in a range of 120° C. to the 180° C.

If above four cases are taken into consideration, it can be known that, in a case injection molding is made with an injection molding device with a predetermined mold, if the mold temperature is maintained at a temperature higher than a predetermined temperature (the melting temperature of the resin), to have the surface contact angle greater than 150°, the surface of the solid becomes superhydrophobic.

Therefore, maintaining the mold temperature higher than the predetermined temperature, i.e., higher than the melting temperature of the resin, in the injection molding is the most important for molding a superhydrophobic product.

A product having hydrophobicity or superhydrophobicity is useful for kitchen wares, clothes, architecture, road, and tile business which require self-cleaning effects and has application in aviation, vessel and automobile business which require reduction of flow resistance.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for injection molding a product having a hydrophobic pattern comprising the steps of:
    heating a fixed mold unit having a cavity using a heater mounted on the fixed mold unit and a movable mold unit with a stamper with a hydrophobic pattern formed thereon mounted thereto using a heater mounted on the movable mold unit so that temperature of the fixed mold unit and the movable mold unit is between 180° C. to 200° C.;
    bringing the movable mold unit with the stamper mounted thereto into close contact with the fixed mold unit for enclosing an inside of the molds so that the cavity is closed;
    injecting a predetermined resin material into the inside of the fixed mold unit and the movable mold unit; and
    cooling down the fixed mold unit and the movable mold unit, and separating the fixed mold unit and the movable mold unit wherein cooling down the fixed mold unit and the movable mold unit comprises bringing a cooling mold with a second magnet toward the movable mold unit with a first magnet by magnetic force between the first magnet and the second magnet so that the cooling mold and the movable mold unit are brought into contact with each other, wherein the cooling mold is guided by a guide member in the movable mold unit for guiding movement of the cooling mold.

2. The method as claimed in claim 1, wherein the step of heating each mold unit includes the step of heating each mold unit with a heater in each mold unit until a surface temperature of each mold unit becomes a preset temperature.

3. The method as claimed in claim 2, wherein the step of bringing each mold unit is performed after the surface temperature of each mold unit reaches to the preset temperature.

4. The method as claimed in claim 1, wherein the step of cooling down each mold unit is performed right after injection of the resin.

5. The method as claimed in claim 4, wherein the cooling of each mold unit in the step of cooling down of each mold unit is made by bringing a cooling mold which is mounted to be able to bring into contact with the molds into contact with the molds.

6. A device for injection molding a product having a hydrophobic pattern comprising:

a mold having a cavity;

a stamper in the cavity having a hydrophobic pattern; and a temperature control unit for controlling a temperature of the mold, the temperature control unit including a heater in the mold, a cooling mold mounted to be able to be brought into contact with the mold for cooling the mold, and a cooling mold driver for driving the cooling mold, wherein the mold includes: a first mold unit having a cavity and a second mold unit mounted to be brought into contact with the first mold selectively, wherein the cooling mold is housed in the second mold unit to be movable within the second mold unit, further comprising:

a first magnet mounted to the second mold and a second magnet mounted to the cooling mold such that the cooling mold and the second mold unit are brought into contact with each other or move away from each other by magnetic force, and a guide member mounted in the second mold unit for guiding movement of the cooling mold.

7. The device as claimed in claim 6, wherein the hydrophobic pattern on the stamper is formed to have a surface contact angle of liquid to be greater than 150° and below 180°.

8. The device as claimed in claim 6, wherein the heater is provided for heating the mold until a surface temperature of the mold reaches to a melting temperature of the resin injected into the mold.

9. The device as claimed in claim 6, wherein one of the first magnet and the second magnet is an electric magnet and the other one is a permanent magnet.

* * * * *